(12) United States Patent
Kistemaker et al.

(10) Patent No.: US 10,450,027 B2
(45) Date of Patent: Oct. 22, 2019

(54) GOLF-BAG CARRYING VEHICLE

(71) Applicants: Frank Kistemaker, Eindhoven (NL); Guido Peters, Helmond (NL)

(72) Inventors: Frank Kistemaker, Eindhoven (NL); Guido Peters, Helmond (NL)

(73) Assignee: COOLRYDE B.V., Eindhoven (NL)

( * ) Notice: Subject to any disclaimer, the term of this patent is extended or adjusted under 35 U.S.C. 154(b) by 188 days.

(21) Appl. No.: 15/655,880

(22) Filed: Jul. 20, 2017

(65) Prior Publication Data
US 2018/0022411 A1     Jan. 25, 2018

Related U.S. Application Data

(60) Provisional application No. 62/364,386, filed on Jul. 20, 2016.

(51) Int. Cl.
*B62K 5/027*     (2013.01)
*B62K 5/08*     (2006.01)
(Continued)

(52) U.S. Cl.
CPC ............... *B62K 5/027* (2013.01); *A63B 55/61* (2015.10); *B62J 11/00* (2013.01); *B62J 17/04* (2013.01);
(Continued)

(58) Field of Classification Search
CPC .. B62M 7/12; B62K 2700/56; B62K 2204/00; B62K 2202/00; B62K 2005/002; B62K 23/02; B62K 21/24; B62K 21/16; B62K 21/00; B62K 15/008; B62K 15/006; B62K 13/04; B62K 5/10; B62K 5/08; B62K 5/05; B62K 5/027; B62J 2099/0026; B62J 2099/002; B62J 2099/0013; B62J 99/00; B62J 25/00; B62J 17/04; B62J 11/00;
(Continued)

(56) References Cited

U.S. PATENT DOCUMENTS 2,937,884 A *    5/1960    Lossau ..................... B62H 1/02
                                                                      280/288.3
3,043,389 A      7/1962    Steinberg
(Continued)

FOREIGN PATENT DOCUMENTS

CN        206325175       7/2017
EP         1917174 B1     9/2012
(Continued)

*Primary Examiner* — Paul N Dickson
*Assistant Examiner* — Timothy Wilhelm (57) ABSTRACT

A golf-bag carrying vehicle is an apparatus that assists a user in transporting their golf bag by either manually push-kicking the apparatus or motorizing the apparatus. The apparatus includes a pair of idle wheels, a stabilizing wheel, a frame, a steering mechanism, a handlebar, and a footboard. The pair of idle wheel arranged at the front end of the frame and the stabilizing wheel arranged at the rear end of the frame are configured into a tricycle configuration, which creates ample space in the center of the apparatus for a rider and/or a payload. The steering mechanism and the handlebar allows a user to steer the apparatus in a desired direction. The footboard allows the user to selectively ride on the apparatus or to manually assist the movement of the apparatus by push-kicking.

16 Claims, 9 Drawing Sheets

(51) Int. Cl.
  *B62K 5/05* (2013.01)
  *B62J 25/00* (2006.01)
  *B62M 7/12* (2006.01)
  *B62K 23/02* (2006.01)
  *B62J 99/00* (2009.01)
  *B62K 21/00* (2006.01)
  *B62K 15/00* (2006.01)
  *B62K 21/16* (2006.01)
  *B62J 11/00* (2006.01)
  *B62J 17/04* (2006.01)
  *B62K 5/10* (2013.01)
  *B62K 21/24* (2006.01)
  *B62K 13/04* (2006.01)
  *A63B 55/60* (2015.01)
  *B62K 5/00* (2013.01)
  *B62D 3/02* (2006.01)

(52) U.S. Cl.
  CPC .............. *B62J 25/00* (2013.01); *B62J 99/00* (2013.01); *B62K 5/05* (2013.01); *B62K 5/08* (2013.01); *B62K 5/10* (2013.01); *B62K 13/04* (2013.01); *B62K 15/006* (2013.01); *B62K 15/008* (2013.01); *B62K 21/00* (2013.01); *B62K 21/16* (2013.01); *B62K 21/24* (2013.01); *B62K 23/02* (2013.01); *B62M 7/12* (2013.01); *A63B 2055/601* (2015.10); *A63B 2055/602* (2015.10); *A63B 2210/50* (2013.01); *A63B 2225/50* (2013.01); *B62D 3/02* (2013.01); *B62J 2099/002* (2013.01); *B62J 2099/0013* (2013.01); *B62J 2099/0026* (2013.01); *B62K 2005/002* (2013.01); *B62K 2202/00* (2013.01); *B62K 2204/00* (2013.01)

(58) Field of Classification Search
  CPC ... B62D 3/02; A63B 2225/50; A63B 2210/50; A63B 2055/602; A63B 2055/601; A63B 55/61
  See application file for complete search history.

(56) References Cited

U.S. PATENT DOCUMENTS

| | | | |
|---|---|---|---|
| 3,513,924 A * | 5/1970 | Jackson | B62K 5/025 180/14.1 |
| 3,648,795 A * | 3/1972 | Moulton | B62B 3/12 180/216 |
| 4,522,281 A * | 6/1985 | Snider | B62K 5/01 180/208 |
| 4,573,549 A * | 3/1986 | Pankow | B62D 61/08 180/216 |
| 4,657,100 A | 4/1987 | Lewis | |
| 4,828,284 A * | 5/1989 | Sandgren | B62K 3/002 280/221 |
| 4,848,504 A | 7/1989 | Olson | |
| 4,974,693 A | 12/1990 | Nakai et al. | |
| 5,161,635 A | 11/1992 | Kiffe | |
| 5,265,695 A * | 11/1993 | Piazzi | B62K 3/002 180/208 |
| 5,328,193 A | 7/1994 | Shiew | |
| 5,540,296 A * | 7/1996 | Strothmann | B60L 50/66 180/19.3 |
| 5,711,388 A * | 1/1998 | Davies | A63B 24/0021 180/168 |
| 5,950,751 A | 9/1999 | McComber | |
| 6,236,940 B1 * | 5/2001 | Rudow | A63B 24/0021 701/300 |
| 6,382,646 B1 | 5/2002 | Shaw | |
| 6,390,216 B1 * | 5/2002 | Sueshige | B60L 50/66 180/65.51 |
| 6,725,954 B1 * | 4/2004 | Keane | B62D 11/12 180/6.48 |
| 6,904,990 B2 * | 6/2005 | Etou | B62M 27/02 180/190 |
| 6,907,949 B1 * | 6/2005 | Wang | B62D 51/02 180/65.51 |
| 6,932,370 B2 * | 8/2005 | Jones | B62K 3/005 280/282 |
| 7,192,040 B2 * | 3/2007 | Xie | B62D 51/001 180/216 |
| 7,322,434 B1 * | 1/2008 | Hussain | B62H 1/12 180/180 |
| 7,866,432 B2 * | 1/2011 | Xie | B62D 21/183 180/252 |
| 7,958,961 B1 | 6/2011 | Schade | |
| 7,992,659 B2 * | 8/2011 | Schaedler | B62D 7/08 180/6.2 |
| 8,005,586 B2 | 8/2011 | Miki et al. | |
| 8,474,841 B2 * | 7/2013 | Ruebusch | B62D 3/02 280/93.502 |
| 8,631,892 B2 * | 1/2014 | Constin | B62B 1/002 180/208 |
| 8,646,794 B2 | 2/2014 | Mullin | |
| 9,051,019 B2 * | 6/2015 | Reck | B62K 3/002 |
| 9,115,790 B2 * | 8/2015 | Zhu | A63B 55/61 |
| 9,174,692 B2 * | 11/2015 | Treadway | B62K 15/00 |
| 9,199,147 B2 * | 12/2015 | Azizi | B62B 3/001 |
| 9,381,785 B2 * | 7/2016 | Gale | B60G 3/145 |
| 9,522,710 B2 * | 12/2016 | Constien | B62H 1/02 |
| 9,555,822 B2 * | 1/2017 | Rauch | B62B 5/0043 |
| 10,016,666 B2 * | 7/2018 | Reimers | A63B 55/61 |
| 2002/0153683 A1 * | 10/2002 | Lee | B62K 3/002 280/87.021 |
| 2003/0019682 A1 * | 1/2003 | Schaedler | A01D 34/69 180/308 |
| 2003/0188906 A1 * | 10/2003 | Bank | B62K 3/002 180/210 |
| 2005/0236803 A1 * | 10/2005 | Summers | B62K 5/05 280/282 |
| 2005/0279538 A1 | 12/2005 | Ivey | |
| 2006/0054370 A1 * | 3/2006 | Sugioka | B62D 61/065 180/211 |
| 2006/0151224 A1 | 7/2006 | Vasser | |
| 2010/0013183 A1 * | 1/2010 | He | B62K 3/002 280/210 |
| 2010/0176574 A1 | 7/2010 | Pollice | |
| 2012/0205170 A1 * | 8/2012 | Adams | B62K 5/02 180/55 |
| 2014/0125021 A1 | 5/2014 | du Toit | |
| 2015/0122566 A1 * | 5/2015 | Constien | B62H 1/02 180/210 |
| 2016/0096574 A1 * | 4/2016 | Liu | B62K 5/10 180/214 |
| 2017/0113503 A1 * | 4/2017 | Wolf | B60B 35/004 |
| 2018/0056152 A1 | 3/2018 | Reimers et al. | |
| 2018/0362109 A1 * | 12/2018 | Vidolov | B62K 5/10 |

FOREIGN PATENT DOCUMENTS

| | | |
|---|---|---|
| KR | 20130104796 A | 9/2013 |
| WO | WO2004093595 A1 | 11/2004 |
| WO | WO2006032275 A2 | 3/2006 |
| WO | WO2010091460 A9 | 12/2010 |
| WO | WO2012069656 A1 | 5/2012 |
| WO | WO2017068316 A1 | 4/2017 |

* cited by examiner

GOLF-BAG CARRYING VEHICLE

The current application claims a priority to the U.S. Provisional Patent application Ser. No. 62/364,386 filed on Jul. 20, 2016.

FIELD OF THE INVENTION

The present invention generally relates to a golf-bag carrying tribrid vehicle.

More specifically, the present invention is a transformable golf-bag carrying vehicle with a semi-powered or fully powered propulsion system that utilizes a tilting mechanism for mitigating the lateral forces generated during a turn.

BACKGROUND OF THE INVENTION

Golf is a sport played by 60 million people from old to young. Beside the exciting aspects of the game, the majority of the golf players also value the physical exercise required to play 9 or 18 holes. This usually means 2 or 4 hours of non-stop walking. Though walking can provide physical exercise for players, in several cases the player may desire to either travel faster or reduce the energy required to go from point A to point B on the golf course. This is true in several cases. For example:
- Walking 150 or 200 meters required to reach the next course is very physically taxing. The exhaustion caused by having to walk for such long distance can negatively affect the players' concentration and result in increased number of mishits.
- If the pace of a player's game is slower than that of other players, other players are required to wait for prolonged periods of time. In this situation, traveling fast across the course can quicken the pace of the game, and reduce the waiting times for other players.
- When searching for the ball, it is desirable to have a quick and convenient way of travelling across the golf course.

With this in mind several solutions have been developed overtime to lessen the physical effort needed to travel several hundred meters while carrying a 7 to 15 kg golf bag with golf clubs. One such invention is the golf trolley to carry the golf bag. The golf trolley solves the problem of carrying a golf bag, but does not solve the problem of getting tired from walking and pushing the trolley. This consequently leads to loss of concentration, leading to deterioration of the golf scores and fun.

This problem is getting bigger the older the people get. Motorized golf trolleys only partly solve the problems by taking away the need to push or pull the trolley during the game. Still the golfer has to walk and a large group of golf players decide to hire a 2-person electric golf cart on the golf course, that transports both the golf bags and the players. However, this solution takes away almost all walking exercise. In surveys people have admitted that really miss the total outdoor physical exercise of walking between courses.

Therefore, a tribrid solution is required which gives players the choice to either be supported by a vehicle or to get some physical exercise by walking. The tribrid solution allows the user the ability to walk, kick, and drive. In this vein, recently, single person solutions are being introduced such as the convertible walking/riding golf cart and self-balancing motorized 2-wheeled vehicles. However, these vehicles have a major disadvantage: in order to travel faster than the walking speed of the average person, one has to switch over to fully motorized support. It is not possible to have a semi-powered propulsion mode which still requires the exertion of physical energy. In addition to this, the weight (about 50 kg) and size of these vehicles is such that it is nearly impossible to transport them in the trunk of a car, which is desired by a lot of players who are used to take their trolleys from their home to the golf course and back.

It is desirable to have a kick-bike type of vehicle that allows fully motorized or a tribrid solution with motorized and physical propulsion. But these aspects are difficult to balance in combination with a golf bag. The geometry of the frame and the steering mechanism do not facilitate an easy to use vehicle with the golf bag positioned at the right position and with a stable mass distribution. The scooting and coasting tricycle offers some freedom of either walking, and kicking but has no motorized support or semi motorized support. This solution is very poor in the sense that the design of the tricycle makes it hard to walk behind or next to the vehicle. Also, the limited amount of space means that it is hard to fully swing that leg and generate a kick. The freedom of the kicking leg is limited to a backswing kick e.g. it is not possible to swing the leg forward.

The present invention provides a golf-bag carrying vehicle in the form of a tricycle configuration, which ensures a more comfortable and faster ride that is capable of transporting of a golf bag while using less energy. The overall size of the present invention is minimized by multiple folding mechanisms, that improving handling, reduces energy required for propulsion, and enables easy and flexible individual transport.

DETAILED DESCRIPTION OF THE INVENTION

All illustrations of the drawings are for the purpose of describing selected versions of the present invention and are not intended to limit the scope of the present invention.

Figure 1:
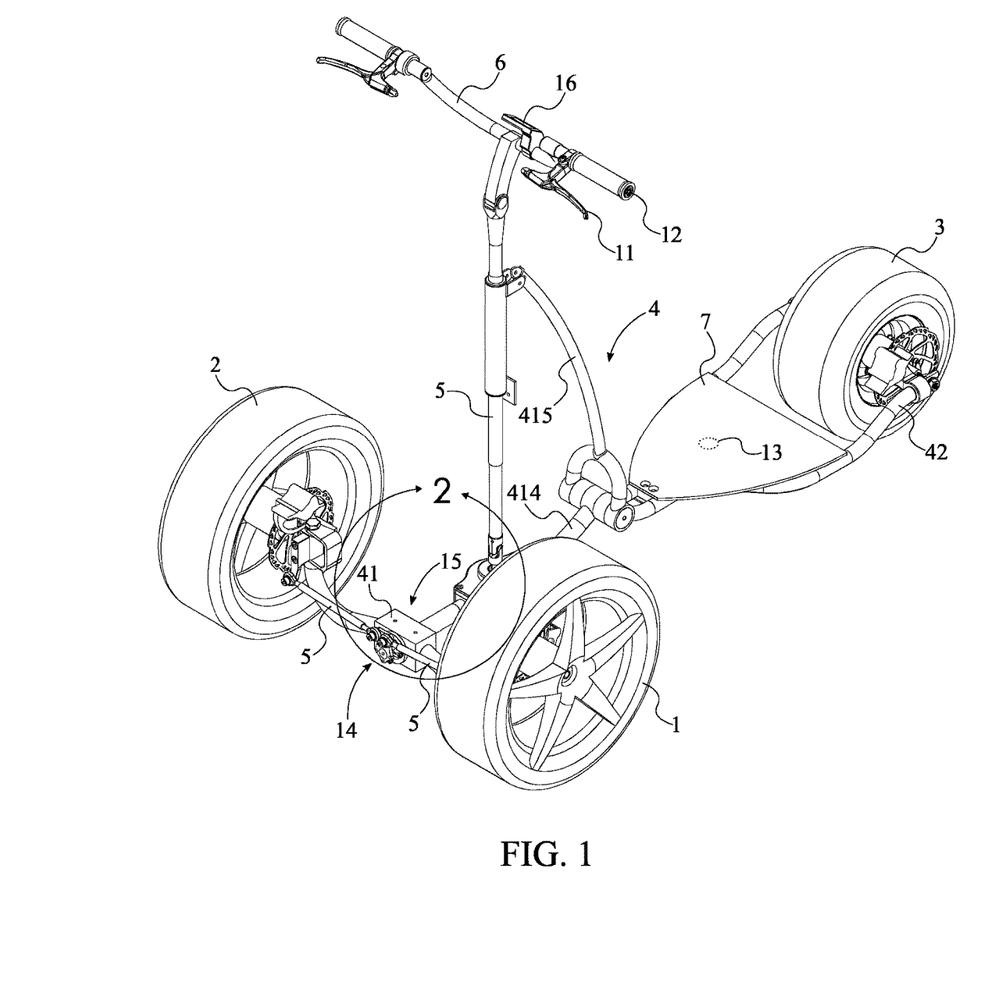
FIG. 1 is a perspective view of the preferred embodiment of the present invention.
Figure 3:
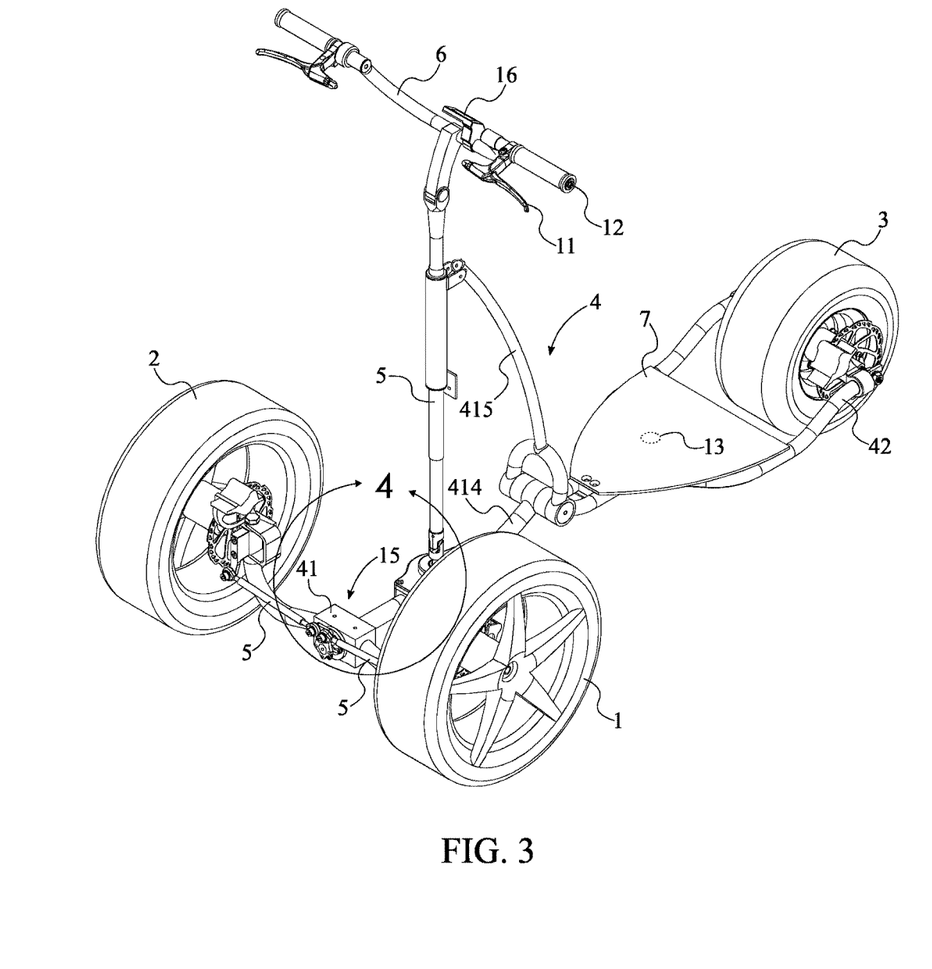
FIG. 3 is a perspective view of the preferred embodiment of the present invention without the tilting mechanism.

As can be seen in FIGS. 1 and 3, the present invention is a golf-bag carrying tribrid vehicle. The preferred embodiment of the present invention comprises a first idle wheel 1, a second idle wheel 2, a stabilizing wheel 3, a frame 4, a steering mechanism 5, a handlebar 6, and a footboard 7. The first idle wheel 1, the second idle wheel 2, and the stabilizing wheel 3 are preferably normal golf wheels arranged in a tricycle configuration which creates ample space in the center for a rider and a payload. The frame 4 further comprises a front end 41 and a rear end 42. The front end 41 and the rear end 42 are configured to provide the frame with an overall T-shape. A rotation axis of the first idle wheel 1 and a rotation axis of the second idle wheel 2 are positioned parallel to each other. As a result, both the first idle wheel 1 and the second idle wheel 2 turn with the same steering angle. The first idle wheel 1 is rotatably and adjacently mounted to the front end 41. Similarly, the second idle wheel 2 is rotatably and adjacently mounted to the front end 41, opposite to the first idle wheel 1. Consequently, the front end 41 is laterally supported by the first idle wheel 1 and the second idle wheel 2.

The steering mechanism 5 is mechanically coupled to the first idle wheel 1 and the second idle wheel 2, wherein the steering mechanism 5 is used to orient the first idle wheel 1 and the second idle wheel 2. The steering mechanism 5 allows the rider to adjust the steering angles of the first idle wheel 1 and the second idle wheel 2. Since the steering angles of the first idle wheel 1 and the second idle wheel 2 are linked together, actuating the steering mechanism 5 generates a lateral force on the front end 41 which turns the frame 4.

The handlebar 6 is pivotably mounted in between the front end 41 and the rear end 42. A couple of handles affixed to the ends of the handlebar 6 provide gripping surfaces for the rider. The handlebar 6 is mechanically coupled to the steering mechanism 5, wherein the handlebar 6 is used to actuate the steering mechanism 5. In the preferred implementation of the present invention, the rider can adjust the steering angles by turning the handlebar 6 in the clockwise or counter-clockwise direction. For example, rotating the handlebar 6 in the clockwise direction may steer the frame 4 to the right, while rotating the handlebar 6 in the counter-clockwise direction will steer the frame 4 to the left. In alternate embodiments of the present invention, a lever or a steering wheel may be used to actuate the steering mechanism 5. The couple of handles on the handlebar 6 also include brake levers for actuating at least three brake pads for stopping the present invention. The first idle wheel 1, the second idle wheel 2, and the stabilizing wheel 3 are each paired with a brake pad that arrest rotational momentum. The stabilizing wheel 3 is rotatably mounted to the rear end 42. This allows the present invention to translate freely in the forward or backward direction. The rider can thus physically propel the present invention of add a motor to physically motorize the present invention. The footboard 7 is mounted onto the rear end 42, adjacent to the stabilizing wheel 3. The footboard 7 secures the user to the present invention. The handlebar 6 helps the rider remain upright on the footboard 7 when the present invention is accelerating. In one possible embodiment of the present invention, the rider may physically propel the present invention by kicking off the ground. The proximity between the footboard 7 and the stabilizing wheel 3 ensures that most of the force generated by the kick is transferred into forward motion.

As can be seen in FIGS. 1, 3, 8, and 9, the present invention may further comprise a hub motor 8, a microcontroller 9, and a portable power source 10. The hub motor 8 motorizes the stabilizing wheel 3 to enable powered propulsion of the present invention. A stator 81 of the hub motor 8 is mounted on to the rear end 42. A rotor 82 of the hub motor 8 is torsionally connected to the stabilizing wheel 3. An electrical current applied to the stator 81 generates a magnetic field capable of spinning the rotor 82. The torsional connection securely transfers rotational motion from the rotor 82 to the stabilizing wheel 3. The microcontroller 9 is electronically connected to the hub motor 8. The microcontroller 9 controls the power delivery of the hub motor 8. The portable power source 10 is removably mounted on to the frame 4. In the preferred implementation, a rechargeable battery may be removably mounted into a slot or compartment that is in electrical communication with the electrically operated components. More specifically, the portable power source 10 is electrically connected to the hub motor 8. The portable power source 10 supplies electrical energy which activates the hub motor 8.

Figure 8:
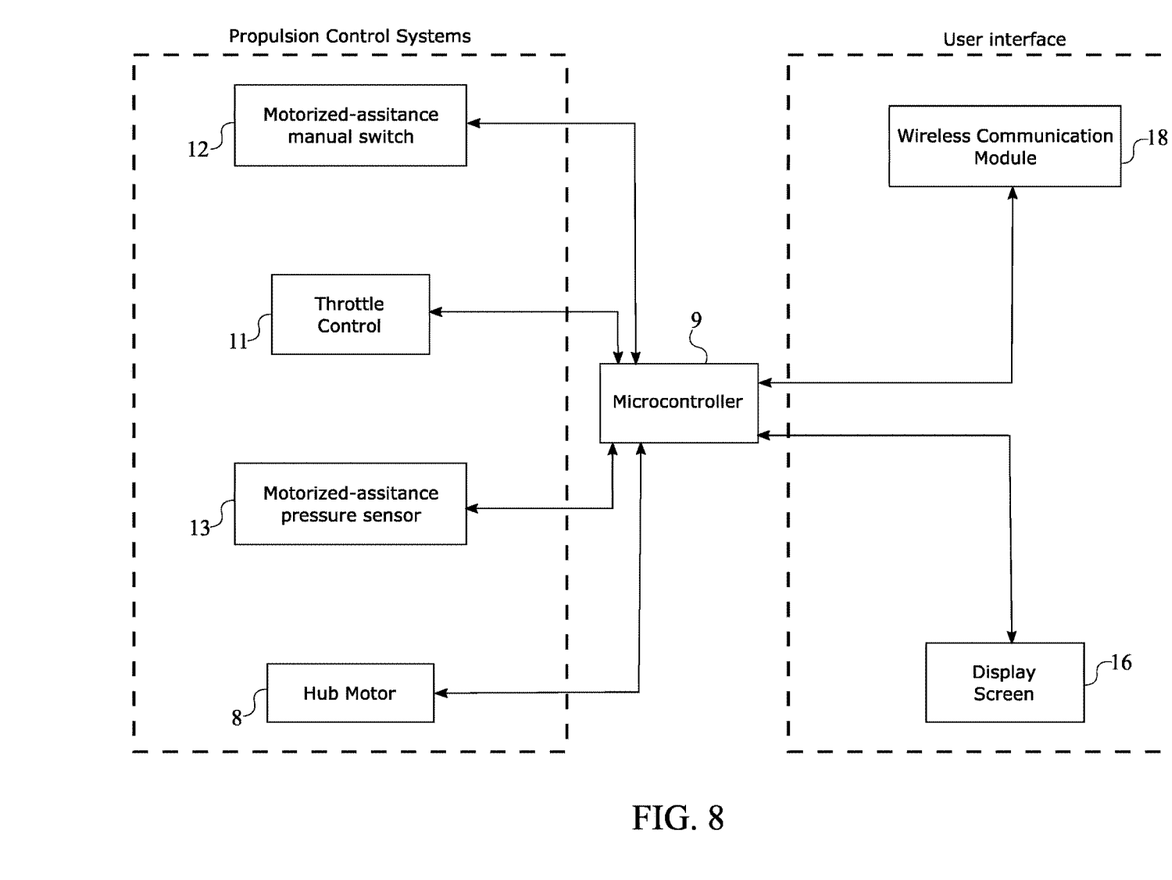
FIG. 8 is a schematic diagram illustrating the electronic connections for the preferred embodiment of the present invention.
Figure 9:
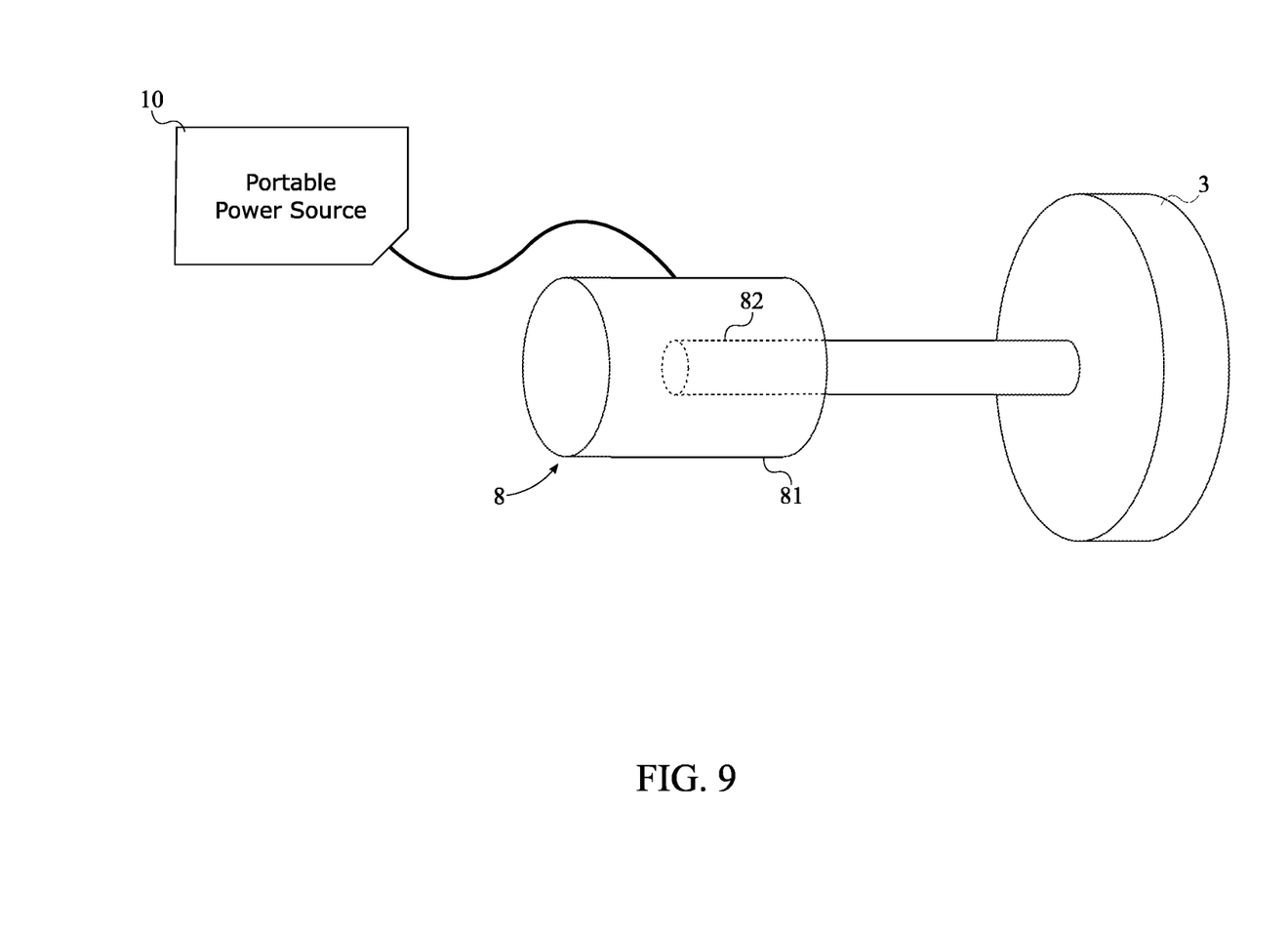
FIG. 9 is a schematic diagram illustrating the electrical connections for the preferred embodiment of the present invention.

A throttle control 11 is integrated into the handlebar 6 in close reach of the rider, which is shown in FIGS. 1, 3, and 8. In the preferred embodiment, the throttle control 11 may be a lever integrated into the handlebar 6. Alternately, the throttle control 11 may be a foot actuated pedal placed on the footboard 7. The throttle control 11 can modulate the power delivery between the portable power source 10 and the hub motor 8. The throttle control 11 is electronically connected to the microcontroller 9. The microcontroller 9 controls the power delivery characteristics of the hub motor 8 based on the inputs provided by the throttle control 11. Alternately, a mechanical linkage may enable the throttle control 11 to control the power delivery characteristics of the hub motor 8.

In addition to the throttle control 11, the present invention utilizes a motorized-assistance manual switch 12, which is also shown in FIGS. 1, 3, and 8. The motorized-assistance manual switch 12 is integrated into the handlebar 6. More specifically, the motorized-assistance manual switch 12 utilizes a button integrated into one of the handles of the handlebar 6. The motorized-assistance manual switch 12 is electronically connected to the microcontroller 9. This allows the microcontroller 9 to adjust the power delivery characteristics of the hub motor 8 based on the inputs provided by the motorized-assistance manual switch 12. For example, if the rider pushes the button, the microcontroller 9 may command the hub motor 8 to operate at a steady speed.

The motorized-assistance manual switch 12 also allows the rider to select from a plurality of speed settings. The plurality of speed settings can be used to increase or decrease the speed at which the hub motor 8 operates. For example, once the rider chooses one of the plurality of speed settings, the microcontroller 9 ensures the speed of the hub motor 8 matches the selected speed. The microcontroller 9 may rely on a speedometer integrated into the stabilizing wheel 3 to measure the speed of the present invention. The preferred speedometer may be either analog or digital as required. If the speed exceeds the selected speed from the plurality of speed settings, the microcontroller 9 may reduce the hub motor 8 power output.

The motorized-assistance manual switch 12 allows the present invention to operate in walk mode. Walk mode allows the rider to walk next to the present invention. The plurality of speed settings propels the present invention at a steady speed that matches the walking speed of the user. The plurality of speed settings can adjust the speed of the of the present invention to match various walking speeds.

A motorized-assistance pressure sensor 13 enables semi-powered propulsion, which is also shown in FIGS. 1, 3, and 8. The motorized-assistance pressure sensor 13 is integrated into the footboard 7. As a result, the motorized-assistance pressure sensor 13 can measure the pressure generated when the rider stands on top of the footboard 7. The motorized-assistance pressure sensor 13 is also electronically connected to the microcontroller 9. Changes in pressure readings cause the microcontroller 9 to adjust the power delivery characteristics of the hub motor 8. For example, when the rider kicks off against the ground, the rider's weight transfers away from the footboard 7. The motorized-assistance pressure sensor 13 measures the reduction in pressure and communicates the pressure readings to the microcontroller 9. The microcontroller 9 may then command the hub motor 8 to provide a burst of power to preserve the forward momentum of the present invention. This can be used as an energy-efficient mode which takes advantage of the rider's kicks to propel the present invention forward.

Alternately, the motorized-assistance manual switch 12 can also be used in combination with the motorized-assistance pressure sensor 13. For example, the motorized-assistance manual switch 12 may actuate the hub motor 8 to sustain the speed above a certain level. The rider can kick to activate the motorized-assistance pressure sensor 13 which may generate a burst of speed.

Figure 2:
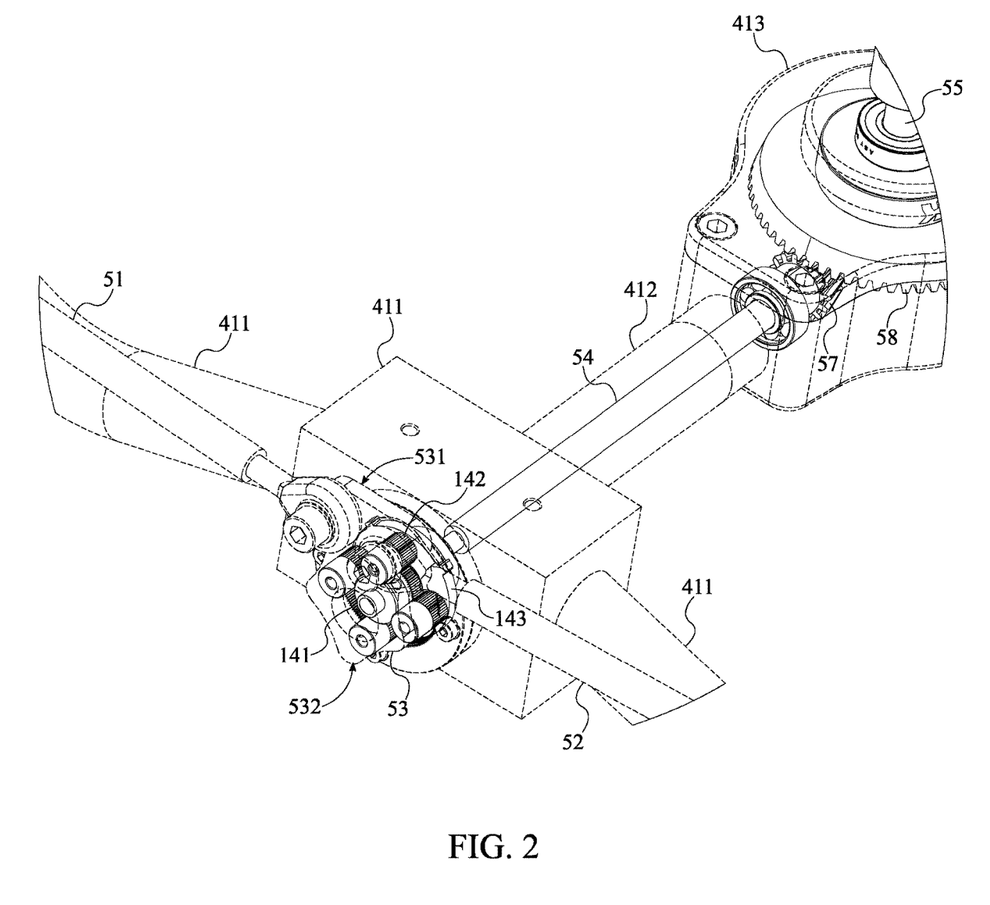
FIG. 2 is a detailed view taken about a circle 2 in FIG. 1.
Figure 4:
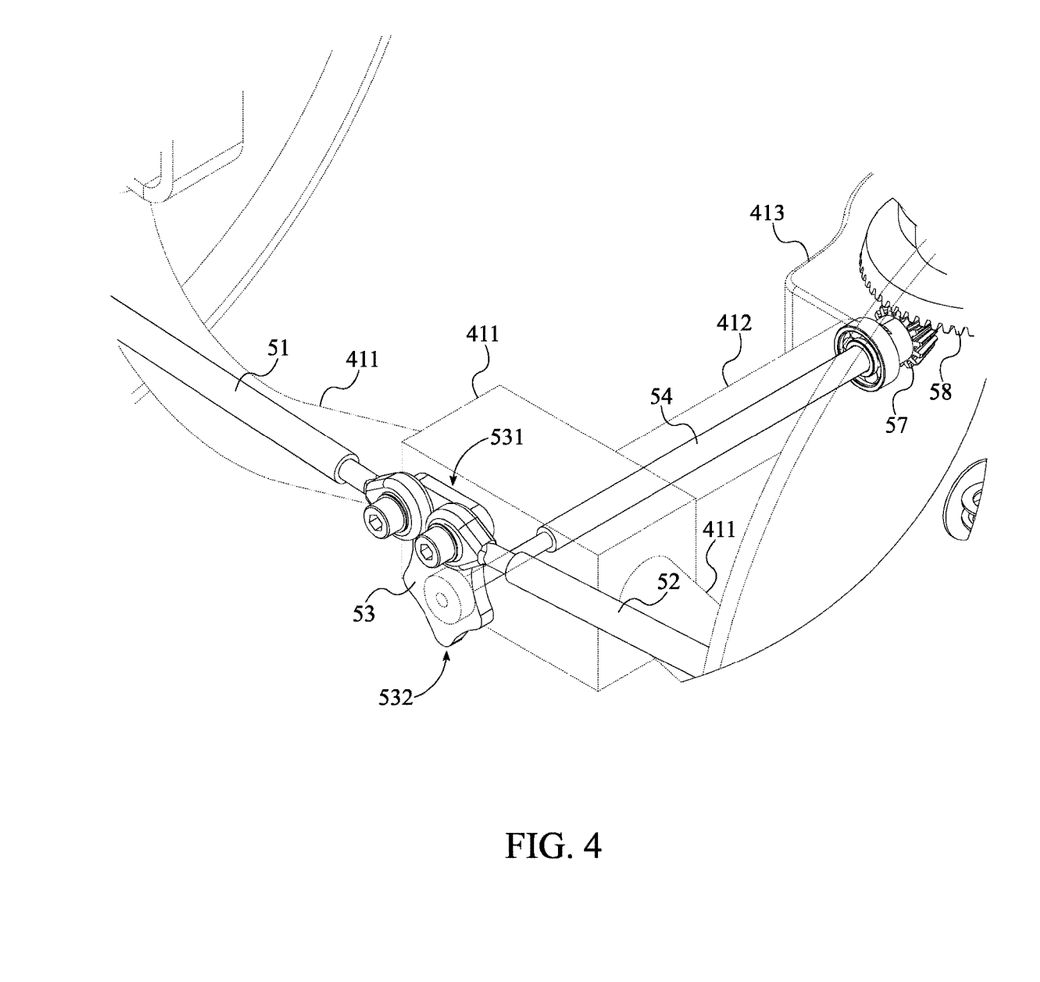
FIG. 4 is a detailed vied taken about a circle 4 in FIG. 3.

As can be seen FIGS. 2 and 4, the preferred embodiment of the steering mechanism 5 further comprises a first linkage arm 51, a second linkage arm 52, a relay arm 53, a transfer shaft 54, and a steering column 55. The first linkage arm 51 and the second linkage arm 52 are arranged in a parallel steering configuration. In this configuration, the first linkage arm 51 and the second linkage arm 52 are pivotably mounted to a free end 531 of the relay arm 53. Rotation of the relay arm 53 causes both the first linkage arm 51 and the second linkage arm 52 to translate in the left or right direction. The first idle wheel 1 is mechanically coupled the first linkage arm 51, opposite to the relay arm 53, wherein the first linkage arm 51 is used to orient the first idle wheel 1. Likewise, the second idle wheel 2 is mechanically coupled the second linkage arm 52, opposite to the relay arm 53, wherein the second linkage arm 52 is used to orient the second idle wheel 2. Both the first linkage arm 51 and the second linkage arm 52 connect in front of the rotation axes of the first idle wheel 1 and the second idle wheel 2. The linear displacement of the first linkage arm 51 and the second linkage arm 52 thus causes the first idle wheel 1 and the second idle wheel 2 to rotate. A pivotably fixed end 532 of the relay arm 53 is torsionally coupled to the transfer shaft 54. Accordingly, the transfer shaft 54 and the relay arm 53 rotate with the same angular displacement. The steering column 55 is torsionally coupled to the transfer shaft 54, opposite the relay arm 53. Consequently, the handlebar 6 is torsionally coupled to the steering column 55, opposite the transfer shaft 54. The torsional coupling between the handlebar 6, the steering column 55, and the transfer shaft 54 transforms rotational movement generated by the user to translational movement of the first linkage arm 51 and the second linkage arm 52.

Figure 6:
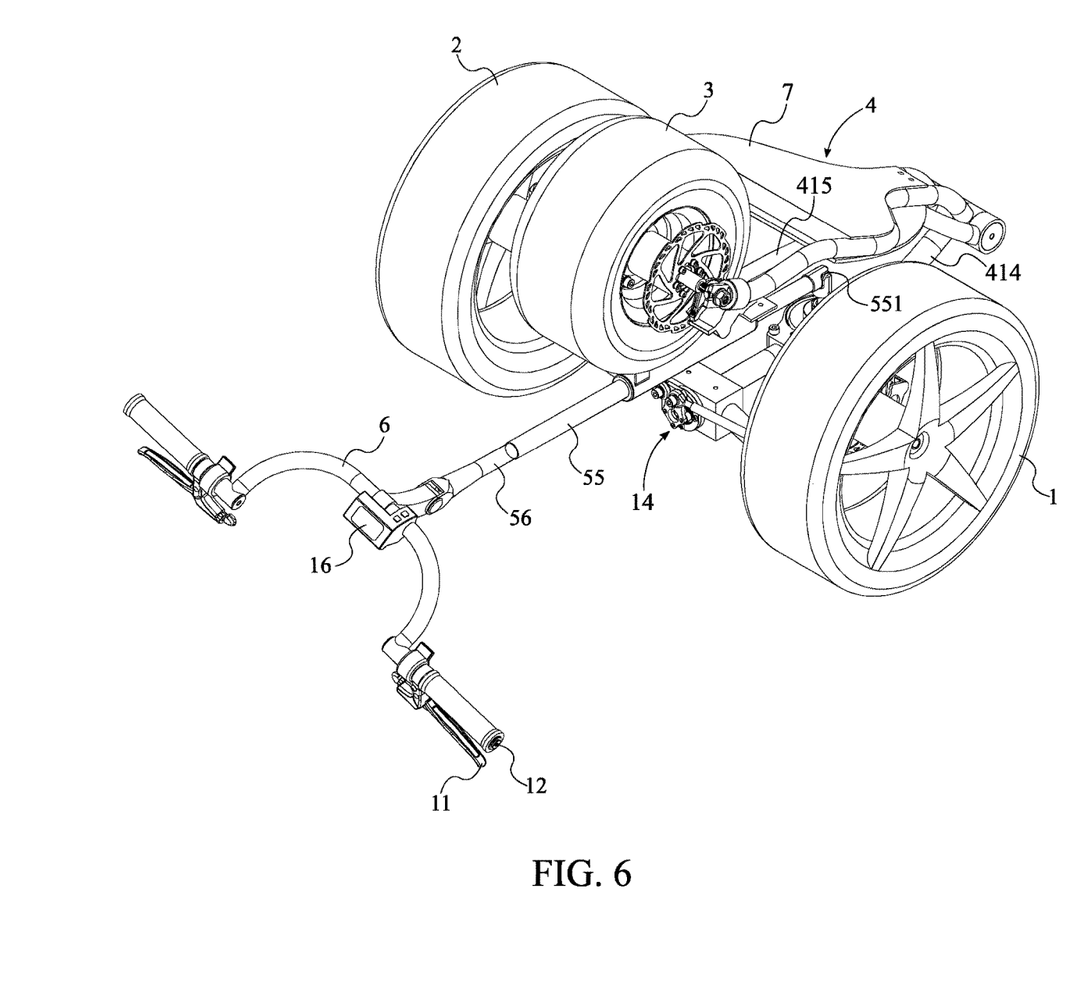
FIG. 6 is a perspective view of the preferred embodiment of the present invention in a transportation configuration.
Figure 7:
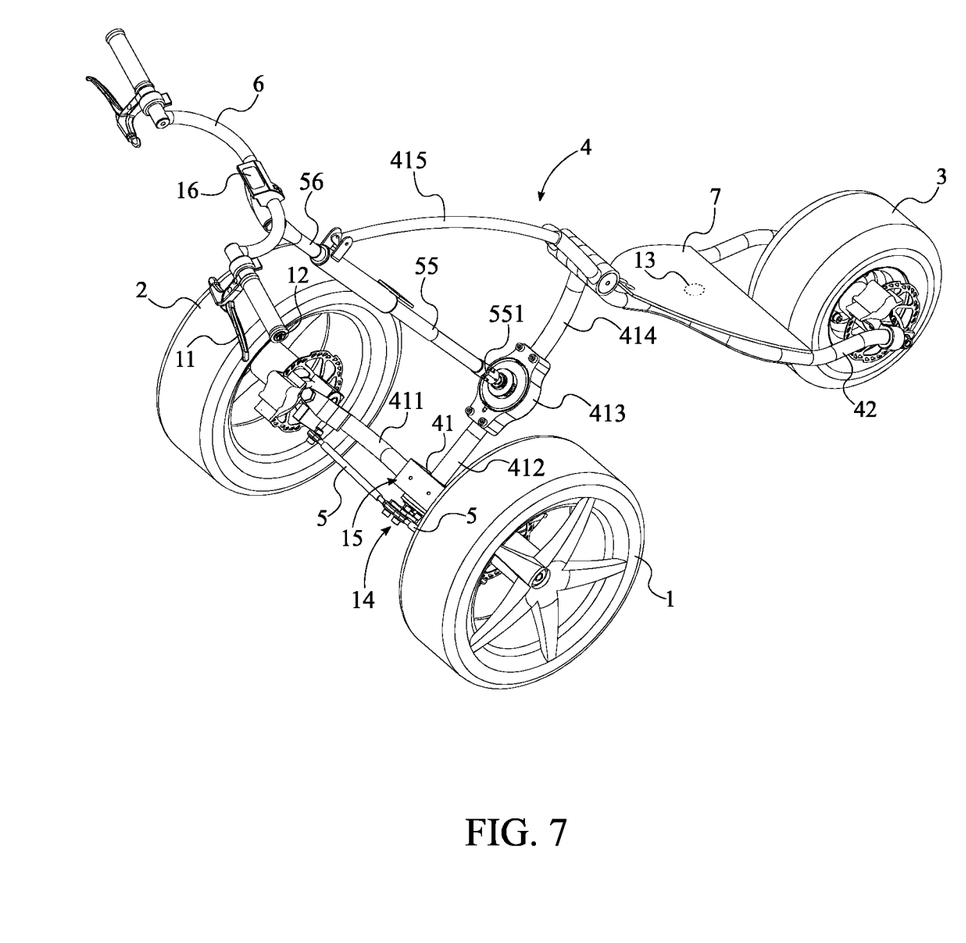
FIG. 7 is a perspective view of the preferred embodiment of the present invention in a trolley configuration.

As can be seen in FIGS. 6 and 7, the present invention utilizes at least one hinged joint 551 to transform the frame 4 into a space-efficient shape for ease of transport. The at least one hinged joint 551 is mechanically integrated along the steering column 55, wherein the at least one hinged joint 551 is used to foldably collapse the steering column 55. Folding the steering column 55 reduces the overall height of the frame 4, making it easier to store the present invention in enclosed spaces.

In addition to the at least one hinged joint 551, an extension shaft 56 is also used to reduce the overall height of the steering column 55. The extension shaft 56 is laterally and centrally connected to the handlebar 6. As such, the vertical displacement between the extension shaft 56 and the handlebar 6 is fixed. The extension shaft 56 is telescopically engaged to the steering column 55. This allows the handlebar 6 to slide in and out of the steering column 55. The extension shaft 56 can be used to control the overall height of the present invention, without having to fold the steering column 55.

A pinion gear 57 and a bevel gear 58 enable a torsional connection between the transfer shaft 54 and the steering column 55, which is shown in FIGS. 2 and 4. The transfer shaft 54 and the steering column 55 are positioned perpendicular to each other. The pinion gear 57 is torsionally and terminally connected to the transfer shaft 54. As a result, rotation axis of the pinion gear 57 is coaxial to the rotation axis of the transfer shaft 54. The bevel gear 58 is torsionally and terminally connected to the steering column 55. As a result, the rotation axis of the bevel gear 58 is coaxial to the rotation axis of the steering column 55. This allows the pinion gear 57 to engage to the bevel gear 58. In the engaged position, the teeth of the pinion gear 57 intermesh with the teeth of the bevel gear 58. This allows the transfer of rotational movement through a torsional connection between the transfer shaft 54 and the steering column 55. The torsional connection between the transfer shaft 54 and the steering column 55 results in the handlebar 6 being positioned central and perpendicular to the steering column 55, which allows the rider to grab the handlebar 6.

As can be seen in FIGS. 2 and 4, the front end 41 further comprises a cross portion 411, a tubular portion 412, and a hub 413. Two U-shaped tubes connect the cross portion 411 to the first idle wheel 1 and the second idle wheel 2. The first idle wheel 1 and the second idle wheel 2 are positioned opposite to each other along the cross portion 411. This increases the overall width of the invention, which also increase the overall lateral stability. The tubular portion 412 is mounted into the cross portion 411. Thus, a mechanical connection is formed between the frame 4 and the steering mechanism 5. The transfer shaft 54 is housed within the tubular portion 412. In the preferred implementation, the transfer shaft can rotate independent of the tubular portion. The hub 413 is connected adjacent to the tubular portion 412, opposite to the cross portion 411. The torsional coupling between the transfer shaft 54 and the steering column 55 is housed within the hub 413. This preserves the proper alignment between the steering column 55 and the transfer shaft 54, ensuring that the bevel gear 58 and the pinion gear 57 remain in contact at all times.

A rotation axis of the first idle wheel 1 and a rotation axis of the second idle wheel 2 are positioned coplanar to each other. This vertically aligns the first idle wheel 1 and the second idle wheel 2. The tubular portion 412 is positioned offset from the rotation axis of the first idle wheel 1 and the rotation axis of the second idle wheel 2. Consequently, the center of gravity of the frame 4 is positioned below the rotation axis of the first idle wheel 1 and the second idle wheel 2. As a result, this reduces the chance of a tip over while taking a sharp turn with the present invention.

In one possible embodiment of the present invention illustrated in FIG. 2, a tilting mechanism 14 enables the frame 4 to tilt in relation to the cross portion 411. The preferred embodiment of the tilting mechanism 14 comprises a sun gear 141, a plurality of planet gears 142, and an annular plate 143. The tilting mechanism 14 is mechanically linked to the steering input provided by the rider. Accordingly, the sun gear 141 is laterally connected around the transfer shaft 54. This allows rotational movement to transfer from the transfer shaft 54 to the sun gear 141. Each of the plurality of planet gears 142 is engaged to the sun gear 141. In particular, the engagement intermeshes the teeth of each of the plurality of planet gears 142 to the teeth of the sun gear 141. Thus, as the sun gear 141 rotates, the plurality of planet gears 142 is compelled to rotate in the opposite direction. Each of the plurality of planet gears 142 is rotatably mounted to the pivotably fixed end 532 of the relay arm 53. Thus, a portion of the steering input is used to steer the first idle wheel 1 and the second idle wheel 2 of the present invention. Further, each of the plurality of planet gears 142 is rotatably mounted to the annular plate 143. Thus, the rotation of the plurality of gears 142 about the sun gear 141 is able to drive the rotation of the annular plate.

The plurality of planet gears 142 is distributed around the annular plate 143. In the preferred implementation, the plurality of planet gears 142 is distributed in an equidistant manner around the annular plate 143. Alternately, the distance between each of the plurality of planet gears 142 can be any distance. A ring gear placed concentric to the sun gear 141 secures the plurality of planet gears 142 in a tangential position with the sun gear 141. The tubular portion 412 is rotatably connected to the cross portion 411. A set of bearings is placed at the interface between the cross portion 411 and the tubular portion 412, allowing the cross portion 411 to remain static while the tubular portion 412 rotates. The annular plate 143 is torsionally connected to the tubular portion 412. As a result, at least a portion of the steering torque generated by the transfer shaft 54, is utilized to rotate the tubular portion 412. Thus, steering input generated at the steering column 55 is distributed to the steering mechanism 5 via the relay arm 53 and to the tilting mechanism 14 via the plurality of planet gears 142 in the annular plate 143.

In another embodiment illustrated in FIG. 4, the present invention may utilize a non-tilting frame 4. In this embodiment, the tubular portion 412 is fixed to the cross portion 411, to prevent the rear end 42 from tilting in relation to the front end 41.

The preferred embodiment of the front end 41 further comprises an extension portion 414, and a counterfort portion 415, which are shown in FIGS. 1 and 3. The counterfort portion 415 adds structural rigidity to the frame 4. The extension portion 414 is connected adjacent to the hub 413. The extension portion 414 serves to elongate the frame 4 which gives the rider room to swing his or her foot while kicking off the ground. The rear end 42 is hingedly and adjacently connected to the extension portion 414, opposite the hub 413. As a result, the rear end 42 can rotate about the front end 41 of the frame 4. As such, a first end of the counterfort portion 415 is rotatably and slidably connected along the steering column 55. Further, a second end of the counterfort portion 415 is hingedly connected to the rear end 42. The angular orientation and the linear position of the counterfort portion 415 in relation to the steering column 55 changes as the rear end 42 rotates about the front end 41. The rotatable connection on both ends of the counterfort portion 415, enables the counterfort portion 415 to fold into the frame 4.

The hinged connection between the extension portion 414 and the rear end 42 allows the present invention to transform between a transportation configuration and a trolley configuration. As can be seen in FIG. 6, the transportation configuration folds the rear end 42 of the frame 4 up and over the front end 41. This greatly reduces both the length and the height of the present invention, which allows the present invention to be stored in confined spaces. For example, the transportation configuration may be utilized to store the present invention in the trunk of a car. The folding angle between the front end 41 and the rear end 42 is almost 180 degrees. The folding angle of the counterfort portion 415 is roughly half that of the front end 41.

As can be seen in FIG. 7, the trolley configuration is designed to help the rider maneuver the present invention while present invention is operating in walking mode. In the trolley configuration, the overall length of the frame 4 is shortened, which reduces the turn radius and allows the present invention to maneuver in narrow spaces. As such, the folding angle between the front end 41 and the rear end 42 may be roughly 45 degrees.

Figure 5:
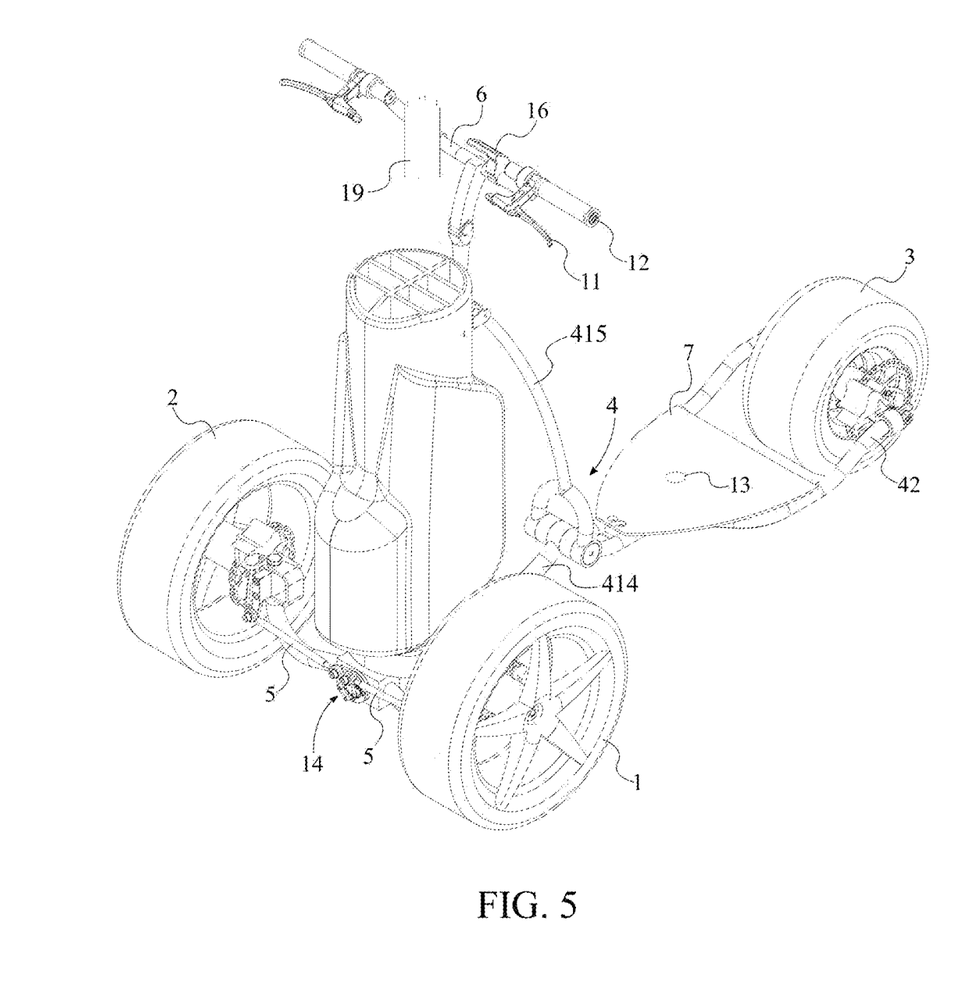
FIG. 5 is a perspective view of the preferred embodiment of the present invention with a mounted golf bag.

As can be seen in FIGS. 1, 3, and 5, the present invention may further comprise a golf-bag mount 15 allows a conventional golf bag to selectively engage the present invention. The golf-bag mount 15 is mounted onto the front end 41 in between the first idle wheel 1 and the second idle wheel 2. The golf bag is laterally supported by the steering column 55. On the bottom, the golf bag is supported by the cross portion 411. Additional securing mechanisms, such as a string that wraps the steering column 55 and the golf bag together, may be utilized to affix the golf bag in the proper position. In the trolley configuration, the bottom of the golf bag rest on the wheel cover of the stabilizing wheel 3. The lateral sides of the golf bag rests on the footboard 7.

The present invention may further comprise a display screen 16, a microcontroller 9, and a wireless communication device 18, which are shown in FIGS. 1, 3, and 8. The wireless communication device 18 and the display screen 16 are electronically connected to the microcontroller 9. As result, the display screen 16 provides another way with which to control the power delivery characteristics of the hub motor 8. The microcontroller 9 and the wireless communication device 18 can be used to provide a navigation system and an entertainment system on the display screen 16. The display screen 16 is laterally mounted to the handlebar 6, in close proximity to the user's hands.

As can be seen in FIG. 5, the present invention may further comprise a plurality of accessories 19 may selectively couple to the present invention. The plurality of accessories 19 includes, but is not limited to, an umbrella, tablet, phone, bottle, balls, bags, a seat, a partly transparent protective shield, etc. The plurality of accessories 19 is affixed and the handlebar 6, but in alternate embodiment, the plurality of accessories 19 may be affixed anywhere on the frame 4.

Alternate Description

As the problems to be solved by the present invention, no integrated and easy transportable solution is available for golf players to have a tribrid that enables partly and full electrical power support without geometric transformation. There is no combined solution that enables golf players to travel at high speeds while carrying their golf bag in an un-motorized way. No solution exists that allows rapid travel and uses less energy while carrying their golf bag in a motorized, un-motorized, and semi-motorized way in a single apparatus. Additionally, no solution exists that can change between the various modes instantly, and is light and small enough to transport in the trunk of a car.

The present invention is a golf-bag carrying tribrid vehicle that is able to carry the weight of an adult person and that of a golf bag (all types including the touring bags), with the geometry of a kick bike to enable full kicking, with a T-shaped three wheel tilting frame to create static and dynamic stability, with on-demand tribrid support in the form of non-assisted and full motorized propulsion, with the robustness and features of a buggy to enable comfortable and full electrical movement, and with a light and foldable structure for easy single person transport and storage.

The present invention is a golf-bag carrying tribrid vehicle that includes, a golf bag volume centrally positioned to the virtual steering axes, an adjustable and foldable steering frame, that connects to the middle of the frame and below the front wheels axes to a headset assembly. The steering frame also connects to the two front wheels axes and, at the lower frame an interface, to an electronics and battery carrier and a lower connection joint for the steering column. The headset assembly comprises a variable tilting mechanism to enable tilting of the foldable lower base frame and handlebar. The lower base frame runs underneath the steering frame and comprises a pivot point, footboard, rear fork and one or two rear wheels. The rear and front wheels can be non-electrical and electrical powered with freewheel, kick supported power and full power functionality. The extendable and foldable steering column consists of a foldable tube and connects to an angular adjustable pivot point handlebar stem.

The object of the invention is to provide a foldable golf trolley and a golf cart in the form of a three (or four) wheel kick bike, which ensures an energy-efficient, comfortable, and faster ride with the ability to transport golf bag. The overall size can be minimized by multiple folding and demount mechanisms, improving handling, reducing the amount of force required and to enable easy and flexible individual transport e.g. take with you in the trunk of your car.

The golf-bag carrying tribrid vehicle includes at least three wheels, a steer with two handlebars, an electric motor with battery, golf bag storage provisions, a tilting footboard. The golf-bag carrying tribrid vehicle can be pivoted and locked into a trolley configuration. The present invention is designed with the lowest and most compact steering mechanism, lowest center of gravity and closest to the steering center point, maximum volume for accommodation and transport of golf bags, and a light, compact, foldable, demountable, tilting bike frame, a handlebar to enable full kicking by the golfer, and a frame that converts to a trolley and transportation configuration. Tilting of frame and handlebar is very important to assure pleasant curve dynamics when steering to the right or left. (one leans over to the right or left when making a bend. The first embodiment of the present invention comprises a u-shaped steering centrally positioned around a golf bag volume in the middle of to the steering point. A headset assembly connects to the middle of the frame at the center axes of the bike and below the front wheels' axes. At both ends of the frame a connection is made to the two front wheels axes. At two positions close to the ends of the steering frame a pivot point connection is made to two steering support tubes. The steering frame has contacts to activate the electrical drive support. At two positions close to the ends of the steering frame a connection is made to a u-shaped tube assembly consisting of an electronics carrier and lower connection joint for the steering column. The headset assembly is connected under an angle to the steering frame to enable tilting of a folding lower base frame. The lower base frame runs underneath of the steering frame and consists of a pivot point, footboard, rear fork and rear wheels. The pivot point has shock absorbing and resilient characteristics. The pivot point can be rotated and secured in different angles. The pivot point can be demounted. the lower base frame is constructed of a small diameter tube. The lower base frame, footboard and rear wheel(s) are located on the center axes of the bike. The extendable and foldable steering column consists of a foldable tube and connects to an angular adjustable pivot point handlebar stem.

An alternate embodiment comprises a parallel steering mechanism in which the steering column is connected to the lower frame pivot point to enable (counter)clock rotation to form the kick bike into a walking trolley and a compact unit for the transport.

In yet another embodiment, the parallel steering mechanism is connected to an adjustable toothed rack to enable variable tilting of the entire lower rear frame.

The rear wheel(s) can be non-electrical and electrical powered to enable tribrid functionality: walk, kick and ride. The electric embodiment comprises various combinations of freewheel, kick-support and fully power functionality. The electric embodiment comprises various combinations of freewheel, kick-support and fully power functionality. This enables golf players to walk next to or kick the present invention with or without any electrical support. This also allows golfers to stand on the present invention with full electrical support. There is a seamlessly and instantly transition between no, assisted and full electrical support types without any electrical or mechanical conversion or modification.

In the electric powered embodiment of the present invention, the rear wheel, and/or the drive wheels comprise an electric wheel hub motor. The handlebars on each side are provided with a speed adjustable on-off button for assisted motorized support of the present invention and bag when walking next the kick-bike. The footboard consists of a sensor to activate power assist when kicking. The handlebar is provided with one or two brakes and a throttle lever for regulating the output of the electric wheel hub motor for full motorized support.

According to another embodiment of the present invention, the front wheels of the present invention have electric wheel hub motors. Alternatively, however, the two front wheels can be driven by only one motor, which is connected to the wheels via a differential gearbox.

The present invention can therefore be designed in a variable manner for different drive forms with modular add-ons. It is particularly advantageous that the lower frame can be folded (counter)clockwise around the lower frame pivot point, wherein the footboard and rear wheels are securely locked in a form-locked manner by way of stops, the steering column is rotated clockwise, and the stepless, height-adjustable, rotatable and lockable handlebar is fixedly installed. This ensures that the present invention can form into a walking trolley and with folded steering column into a compact unit for being transported inside another vehicle. Furthermore, the present invention can comprise a foldable, height-adjustable and removable saddle or seat for the driver, wherein the support can be added when kicking is not required. Further advantages and details will become apparent from the description that follows, with reference to the attached drawings.

Although the invention has been explained in relation to its preferred embodiment, it is to be understood that many other possible modifications and variations can be made without departing from the spirit and scope of the invention as hereinafter claimed.

What is claimed is:
1. A golf-bag carrying vehicle comprises:
   a first idle wheel;
   a second idle wheel;
   a stabilizing wheel;
   a frame;
   a steering mechanism;
   a handlebar;
   a footboard;
   the frame comprises a front end and a rear end;

a rotation axis of the first idle wheel and a rotation axis of the second idle wheel being positioned parallel to each other;

the first idle wheel being rotatably and adjacently mounted to the front end;

the second idle wheel being rotatably and adjacently mounted to the front end, opposite to the first idle wheel;

the steering mechanism being mechanically coupled to the first idle wheel and the second idle wheel, wherein the steering mechanism is used to orient the first idle wheel and the second idle wheel;

the handlebar being pivotably mounted in between the front end and the rear end;

the handlebar being mechanically coupled to the steering mechanism, wherein the handlebar is used to actuate the steering mechanism;

the stabilizing wheel being rotatably mounted to the rear end;

the footboard being mounted onto the rear end adjacent to the stabilizing wheel;

the steering mechanism comprises a first linkage arm, a second linkage arm, a relay arm, a transfer shaft, and a steering column; and the first linkage arm and the second linkage arm being pivotably mounted to a free end of the relay arm;

the first idle wheel being mechanically coupled the first linkage arm, opposite to the relay arm, wherein the first linkage arm is used to orient the first idle wheel;

the second idle wheel being mechanically coupled the second linkage arm, opposite to the relay arm, wherein the second linkage arm is used to orient the second idle wheel;

a pivotably fixed end of the relay arm being torsionally coupled to the transfer shaft;

the steering column being torsionally coupled to the transfer shaft, opposite the relay arm;

the handlebar being torsionally coupled to the steering column, opposite the transfer shaft;

a pinion gear;

a bevel gear;

the transfer shaft and the steering column being positioned perpendicular to each other;

the pinion gear being torsionally and terminally connected to the transfer shaft;

the bevel gear being torsionally and terminally connected to the steering column; and the pinion gear being engaged to the bevel gear.

2. The golf-bag carrying vehicle as claimed in claim 1 comprises:

a hub motor;

a microcontroller;

a portable power source;

a stator of the hub motor being mounted onto the rear end;

a rotor of the hub motor being torsionally connected to the stabilizing wheel;

the microcontroller being electronically connected to the hub motor;

the portable power source being removably mounted on to the frame; and the portable power source being electrically connected to the hub motor.

3. The golf-bag carrying vehicle as claimed in claim 2 comprises:

a throttle control;

the throttle control being integrated into the handlebar; and the throttle control being electronically connected to the microcontroller.

4. The golf-bag carrying vehicle as claimed in claim 2 comprises:

a motorized-assistance manual switch;

the motorized-assistance manual switch being integrated into the handlebar; and the motorized-assistance manual switch being electronically connected to the microcontroller.

5. The golf-bag carrying vehicle as claimed in claim 2 comprises:

a motorized-assistance pressure sensor;

the motorized-assistance pressure sensor being integrated into the footboard; and the motorized-assistance pressure sensor being electronically connected to the microcontroller.

6. The golf-bag carrying vehicle as claimed in claim 1 comprises:

at least one hinged joint; and the at least one hinged joint being mechanically integrated along the steering column, wherein the at least one hinged joint is used to foldably collapse the steering column.

7. The golf-bag carrying vehicle as claimed in claim 1 comprises:

an extension shaft;

the extension shaft being laterally and centrally connected to the handlebar; and the extension shaft being telescopically engaged to the steering column.

8. The golf-bag carrying vehicle as claimed in claim 1 comprises:

the handlebar being positioned central and perpendicular to the steering column.

9. The golf-bag carrying vehicle as claimed in claim 1 comprises:

the front end comprises a cross portion, a tubular portion, and a hub;

the first idle wheel and the second idle wheel being positioned opposite to each other along the cross portion;

the tubular portion being mounted into the cross portion;

the transfer shaft being housed within the tubular portion;

the hub being connected adjacent to the tubular portion, opposite to the cross portion; and the torsional coupling between the transfer shaft and the steering column being housing within the hub.

10. The golf-bag carrying vehicle as claimed in claim 9 comprises:

a rotation axis of the first idle wheel and a rotation axis of the second idle wheel being positioned coplanar to each other; and the tubular portion being positioned offset from the rotation axis of the first idle wheel and the rotation axis of the second idle wheel.

11. The golf-bag carrying vehicle as claimed in claim 9 comprises:

a tilting mechanism;

the tilting mechanism comprises a sun gear, a plurality of planet gears, and an annular plate;

the sun gear being laterally connected around the transfer shaft;

each of the plurality of planet gears being engaged to the sun gear;

each of the plurality of planet gears being rotatably mounted to the pivotably fixed end of the relay arm;

each of the plurality of planet gears being rotatably mounted to the annular plate;
the plurality of planet gears being distributed around the annular plate;
the tubular portion being rotatably connected to the cross portion; and
the annular plate being torsionally connected to the tubular portion.

12. The golf-bag carrying vehicle as claimed in claim 9 comprises:
the tubular portion being fixed to the cross portion.

13. The golf-bag carrying vehicle as claimed in claim 1 comprises:
the front end comprises a hub, an extension portion, and a counterfort portion;
the torsional coupling between the transfer shaft and the steering column being housing within the hub;
the extension portion being connected adjacent to the hub;
the rear end being hingedly and adjacently connected to the extension portion, opposite the hub;
a first end of the counterfort portion being rotatably and slidably connected along the steering column; and
a second end of the counterfort portion being hingedly connected to the rear end.

14. The golf-bag carrying vehicle as claimed in claim 1 comprises:
a golf-bag mount; and
the golf-bag mount being mounted onto the front end in between the first idle wheel and the second idle wheel.

15. The golf-bag carrying vehicle as claimed in claim 1 comprises:
a display screen;
a microcontroller;
a wireless communication device;
the wireless communication device and the display screen being electronically connected to the microcontroller; and
the display screen being laterally mounted to the handlebar.

16. The golf-bag carrying vehicle as claimed in claim 1 comprises:
a plurality of accessories; and
the plurality of accessories being affixed to the handlebar.

* * * * *